United States Patent
Enomoto (10) Patent No.: US 6,433,939 B2
(45) Date of Patent: Aug. 13, 2002

(54) ZOOM LENS SYSTEM

(75) Inventor: Takashi Enomoto, Chiba (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/769,456

(22) Filed: Jan. 26, 2001

(30) Foreign Application Priority Data

Jan. 28, 2000 (JP) .................................. 2000-019917

(51) Int. Cl.⁷ .............................................. G02B 15/14
(52) U.S. Cl. .................................................. 359/689
(58) Field of Search ................ 359/676, 683, 359/686, 689

(56) References Cited

U.S. PATENT DOCUMENTS

| | | | |
|---|---|---|---|
| 5,033,832 A | 7/1991 | Ito | 359/689 |
| 5,260,833 A | 11/1993 | Ito et al. | 359/689 |
| 5,315,439 A | 5/1994 | Ito | 359/689 |
| 5,363,243 A | * 11/1994 | Tarayuki et al. | 359/689 |
| 5,559,636 A | 9/1996 | Ito | 359/689 |
| 5,587,841 A | 12/1996 | Ito | 359/689 |
| 5,793,533 A | 8/1998 | Yoneyama et al. | 359/689 |
| 5,793,535 A | 8/1998 | Ito et al. | 359/689 |
| 5,838,500 A | 11/1998 | Ito et al. | 359/689 |
| 5,969,880 A | 10/1999 | Hasushita et al. | 359/689 |
| 6,271,973 B1 | * 8/2001 | Ohtake et al. | 359/689 |

* cited by examiner

Primary Examiner—Scott J. Sugarman
(74) Attorney, Agent, or Firm—Greenblum & Bernstein, P.L.C.

(57) ABSTRACT

A zoom lens system includes a first lens group, a second lens group, and a third lens group, in this order from the object. Zooming is performed by moving the first through third lens groups. The zoom lens system satisfies the following conditions:

$$0.62 < (d_{T12} - d_{W12})/f_W < 1.0 \quad (1)$$

$$4 < f_T/f_{12T} < 6 \quad (2)$$

$$5 < |f_T/f_{3G}| < 8 \quad (3)$$

wherein $d_{T12}$ designates the distance between the first and the second lens groups at the long focal length extremity; $d_{W12}$ designates the distance between the first and the second lens groups at the short focal length extremity; $f_W$ designates the focal length of the entire zoom lens system at the short focal length extremity; $f_T$ designates the focal length of the entire zoom lens system at the long focal length extremity; $f_{12T}$ designates the combined focal length of the first lens group and the second lens group at the long focal length extremity; and $f_{3G}$ designates the focal length of the negative third lens group.

7 Claims, 7 Drawing Sheets

—— d Line
----- g Line
----- C Line

-1.0    1.0
SPHERICAL
ABERRATION

CHROMATIC
ABERRATION

Fig.2B
$W=36.3°$

-0.05   0.05
LATERAL
CHROMATIC
ABERRATION

-1.0    1.0
ASTIGMATISM

Fig.2D
$W=36.3°$

-5.0 (%) 5.0
DISTORTION

Fig.3A
$F_{NO}=6.0$

-1.0  1.0
SPHERICAL
ABERRATION

CHROMATIC
ABERRATION

— d Line
---- g Line
--- C Line

Fig.3B
W=22.9°

-0.05  0.05
LATERAL
CHROMATIC
ABERRATION

Fig.3C
W=22.9°

-1.0  1.0
ASTIGMATISM

-5.0 (%) 5.0
DISTORTION

Fig.4A
$F_{NO}=12.8$

-1.0  1.0
SPHERICAL
ABERRATION

CHROMATIC
ABERRATION

— d Line
---- g Line
--- C Line

Fig.4B
W=10.1°

-0.05  0.05
LATERAL
CHROMATIC
ABERRATION

Fig.4C
W=10.1°

-1.0  1.0
ASTIGMATISM

-5.0 (%) 5.0
DISTORTION

——— d Line
------- g Line
— — C Line

-1.0  1.0
SPHERICAL
ABERRATION

CHROMATIC
ABERRATION

Fig.6B
W=36.1°

-0.05  0.05
LATERAL
CHROMATIC
ABERRATION

-1.0  1.0
ASTIGMATISM

Fig.6D
W=36.1°

-5.0 (%) 5.0
DISTORTION

—— d Line
----- g Line
--- C Line

-1.0  1.0
SPHERICAL
ABERRATION

CHROMATIC
ABERRATION

Fig.10B
W=36.3°

-0.05  0.05
LATERAL
CHROMATIC
ABERRATION

-1.0  1.0
ASTIGMATISM

Fig.10D
W=36.3°

-5.0 (%) 5.0
DISTORTION

Fig.11A
$F_{NO}=6.0$

-1.0  1.0
SPHERICAL
ABERRATION

CHROMATIC
ABERRATION

— d Line
---- g Line
--- C Line

Fig.11B
$W=22.9°$

-0.05  0.05
LATERAL
CHROMATIC
ABERRATION

Fig.11C
$W=22.9°$

-1.0  1.0
ASTIGMATISM

-5.0 (%) 5.0
DISTORTION

Fig.12A
$F_{NO}=12.5$

-1.0  1.0
SPHERICAL
ABERRATION

CHROMATIC
ABERRATION

— d Line
---- g Line
--- C Line

Fig.12B
$W=10.5°$

-0.05  0.05
LATERAL
CHROMATIC
ABERRATION

Fig.12C
$W=10.5°$

-1.0  1.0
ASTIGMATISM

-5.0 (%) 5.0
DISTORTION

Fig.13

ZOOM LENS SYSTEM

BACKGROUND OF THE INVENTION

1. Field of the Invention

The present invention relates to a zoom lens system for a compact camera.

2. Description of the Related Art

In a zoom lens system for a compact camera, in addition to a requirement of an increased zoom ratio, a shorter focal length at the short focal length extremity has been required in recent years. In a zoom lens system for a single lens reflex (SLR) camera, a retrofocus zoom lens system including a negative front lens group and a positive rear lens group, in this order from the object, has been employed, since a long back focal distance is required to secure a space for providing a mirror. Unlike a SLR camera, a compact camera does not require a long back focal distance, so that a telephoto zoom lens system including a positive front lens group and a negative rear lens group, in this order from the object, is suitable for a zoom lens system thereof.

For compact cameras, conventional zoom lens systems with a zoom ratio of about 3 have employed a three-lens-group arrangement. The main reason for this tendency is that the correcting of field curvature over the entire zooming range is difficult if an attempt is made to achieve a high zoom ratio in a two-lens-group arrangement. In contrast to the two-lens-group arrangement, with the three-lens-group arrangement, by varying the distance between the first lens group and the second lens group, the correcting of field curvature can easily be made even if a high zoom ratio is set.

However, if an attempt is further made to obtain a zoom ration of about 4, the change in the distance between the first and second lens groups becomes longer, thereby the overall length of the zoom lens system becomes long. Furthermore, if the half angle of view at the short focal length extremity exceeds 35°, since the diameters of the first and second lens groups are increased in order to collect peripheral illumination, the size of the entire zoom lens system is inevitably increased, which results in an increase of both camera thickness (front-to-back length) and height (up-to-bottom length) for accommodating the zoom lens system.

SUMMARY OF THE INVENTION

It is an object of the present invention to provide a small three-lens-group zoom lens system of telephoto type which has a zoom ratio of about 4.0, and has the half angle of view at the short focal length extremity is more than 35°.

According to the present invention, the following effects (i) to (iii) can be attained by determining the optical power (hereinafter, power) of the third lens group, and the combined power of the first and second lens groups so that a sufficient space is secured between the first and second lens groups to move, while the overall length and diameter of the lens system can be reduced:

(i) a high zoom ratio, e.g., about 4;
(ii) a shorter focal length at the short focal length extremity, e.g., the half angle of view thereat more than 35°; and
(iii) miniaturization of the lens system.

In order to achieve the above-mentioned object, there is provided a zoom lens system including a positive first lens group, a positive second lens group, and a negative third lens group, in this order from the object. zooming is performed by moving the first through third lens groups in the optical axis direction. The zoom lens system satisfies the following conditions:

$$0.62 < (d_{T12} - w_{12})/f_W < 1.0 \tag{1}$$

$$4 < f_T/f_{12T} < 6 \tag{2}$$

$$5 < f_T/|f_{3G}| < 8 \tag{3}$$

wherein
- $d_{T12}$ designates the distance between the first lens group and the second lens group at the long focal length extremity;
- $d_{W12}$ designates the distance between the first lens group and the second lens group at the short focal length extremity;
- $f_W$ designates the focal length of the entire zoom lens system at the short focal length extremity;
- $f_T$ designates the focal length of the entire zoom lens system at the long focal length extremity;
- $f_{12T}$ designates the combined focal length of the first lens group and the second lens group at the long focal length extremity; and
- $f_{3G}$ designates the focal length of the negative third lens group.

The zoom lens system preferably satisfies the following condition:

$$0.7 < d_{T12}/f_W 21\ 1.0 \tag{4}$$

The most-object side surface of the positive first lens group can be a concave surface facing towards the object, and the most-object side concave surface preferably satisfies the following condition:

$$-5 < r1/f_W < -1 \tag{5}$$

wherein
- r1 designates the radius of curvature of the most-object side concave surface of the first lens group.

The most-object side lens element of the positive first lens group can be a negative lens element, and this negative lens element preferably satisfies the following condition:

$$-0.7 < f_{1P}/f_W < -0.1 \tag{6}$$

wherein
- $f_{1P}$ designates the focal length of the most-object side negative lens element of the first lens group.

The positive first lens group can include a negative first lens element and a positive second lens element, in this order from the object.

In the positive second lens group can include a lens element having at least one aspherical surface, and the aspherical surface preferably satisfies the following condition:

$$-1000 < \Delta IASP < -500 \tag{7}$$

wherein
- $\Delta IASP$ designates the amount of change of the spherical aberration coefficient due to the aspherical surface under the condition that the focal length of the entire zoom lens system at the long focal length extremity is converted to 1.0.

In the negative third lens group can include a lens element having at least one aspherical surface, and the aspherical surface preferably satisfies the following condition:

$$0 < \Delta VASP < 0.2 \tag{8}$$

wherein

ΔVASP designates the amount of change of the distortion coefficient due to the aspherical surface under the condition that the focal length of the entire zoom lens system at the short focal length extremity is converted to 1.0.

The present disclosure relates to subject matter contained in Japanese Patent Application No. 2000-019917 (filed on Jan. 28, 2000) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 13:
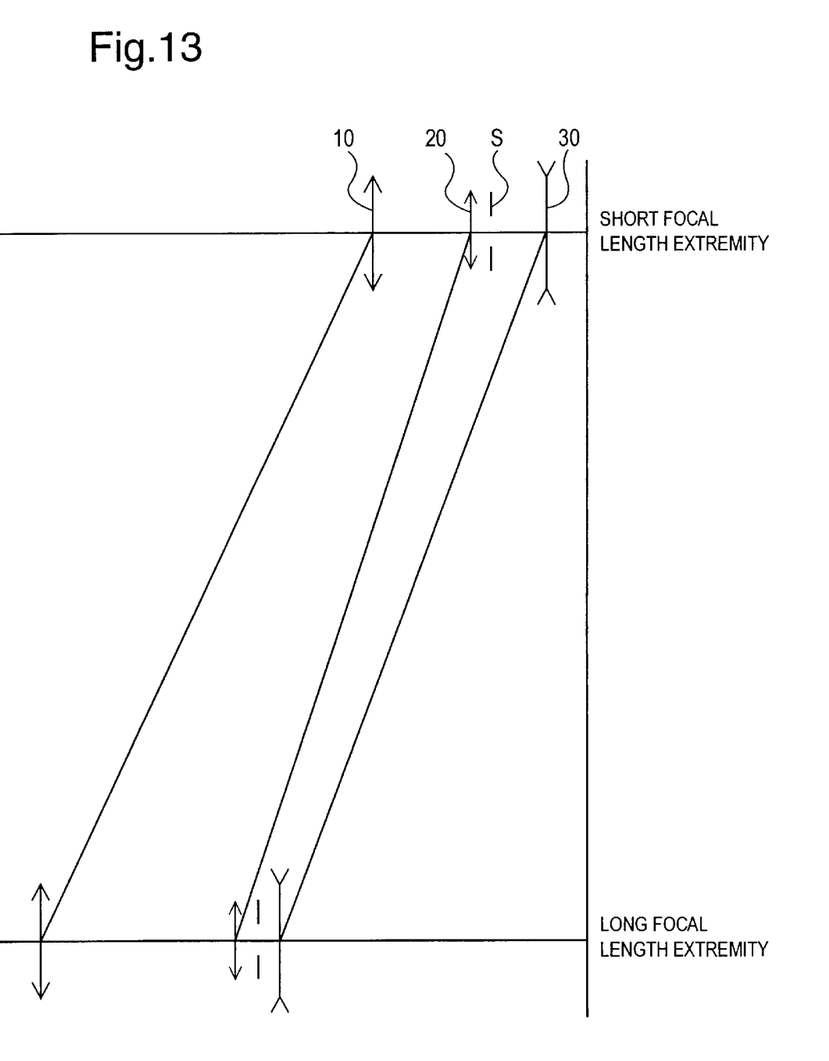
FIG. 13 shows lens-group moving paths of the zoom lens system according to the present invention.

The zoom lens system, as shown in FIG. 13, includes a positive first lens group 10, a positive second lens group 20 and a negative third lens group 30, in this order from the object. Upon zooming from the short focal length extremity to the long focal length extremity, all the lens groups monotonously (linearly) move towards the object, while the distance between the first lens group 10 and the second lens group 20 increases, and the distance between the second lens group 20 and the third lens group 30 decreases. If the positive first lens group 10 and the positive second lens group 20 are considered to be a positive front lens group, the relationship between this positive front lens group and the negative third lens group (rear lens group) 30 can be classified as a telephoto-type zoom lens system. The aperture stop S is provided between the second lens group 20 and the third lens group 30, and moves together with the second lens group 20.

Condition (1) specifies the change in the distance between the first lens group 10 and the second lens group 20 from the short focal length extremity to the long focal length extremity. By changing the traveling distances of the first and second lens groups so that condition (1) is satisfied, field curvature can be corrected over the entire zooming range, and a higher zoom rati can be attained.

If $(d_{T12}d-_{W12})/f_W$ exceeds upper limit of condition (1), the change in the distance between the first and second lens groups becomes large, so that miniaturization cannot be attained.

If $(d_{T12}d-_{W12})/f_W$ exceeds lower limit of condition (1), field curvature cannot be corrected sufficiently, so that a higher zoom ration cannot be obtained.

Condition (2) specifies the combined focal length of the first lens group 10 and the second lens group 20. By satisfying this condition, the traveling distances of the first and second lens groups can be reduced, so that miniaturization of the lens system can be attained.

If $f_T/f_{12T}$ exceeds upper limit of condition (2), the power of the first lens group 10 and that of the second lens group 20 become too strong, thereby aberrations occurred therein are increased. As a result, fluctuations of aberrations upon zooming become large.

If $f_T/f_{12T}$ exceeds lower limit of condition (2), the traveling distances of the first lens group 10 and the second lens group 20 become long, so that miniaturization cannot be attained.

Condition (3) specifies the focal length of the negative third lens group 30. By satisfying this condition, the traveling distance of the third lens group 30 can be made short, thereby miniaturization of the zoom lens system can be attained.

If $f_T/|f_{3G}|$ exceeds the upper limit of condition (3), the power of the third lens group 30 becomes too strong, thereby aberrations occurred in the third lens group 30 increase. As a result, fluctuations of aberrations upon zooming become large.

If $f_T/|f_{3G}|$ exceeds the lower limit of condition (3), the traveling distance of the third lens group 30 becomes long, thereby miniaturization of the zoom lens system cannot be attained.

Condition (4) specifies the distance between the first lens group 10 and the second lens group 20 at the long focal length extremity. By satisfying this condition, mainly field curvature can be corrected, while the overall length of the zoom lens system at the long focal length extremity is reduced.

If $d_{T12}/f_W$ exceeds the upper limit of condition (4), the distance between the first lens group 10 and the second lens group 20 increases, thereby miniaturization of the zoom lens system cannot be achieved.

If $d_{T12}/f_W$ exceeds the lower limit of condition (4), field curvature, in particular, at the long focal length extremity cannot be sufficiently corrected.

Condition (5) specifies the radius of curvature of the most-object side surface of the positive first lens group 10. By satisfying this condition and forming the most-object side surface as a diverging surface (i.e., concave surface), the amount of peripheral illumination at the short focal length extremity can suitably be maintained. Accordingly, compared with a convex surface, an increase of the diameter of the front lens group can be prevented.

If r1/$f_W$ exceeds the upper limit of condition (5), the radius of curvature of the most-object side surface of the first lens group 10 becomes too small, thereby manufacture thereof is difficult.

If r1/$f_W$ exceeds the lower limit of condition (5), a divergent effect of the most-object side surface cannot be obtained, and peripheral illumination becomes insufficient.

Condition (6) specifies the power of a negative lens element of the first lens group 10 in the case where the negative lens element is the most-object side lens element thereof. By satisfying this condition, aberrations occurred in the first lens group 10 can be reduced.

If $f_{1P}/f_W$ exceeds the upper limit of condition (6), the effect of the correcting of aberrations by the most-object side lens element cannot be achieved.

If $f_{1P}/f_W$ exceeds the lower limit of condition (6), aberrations occurred in by the most-object side lens element become large, and optical sensitivity of the most-object side lens element is increased.

Condition (7) specifies the amount of change of the spherical aberration coefficient due to an aspherical surface in the case where at least one lens element having at least one aspherical surface thereon is provided in the positive second lens group 20. By satisfying this condition, the number of lens elements constituting the second lens group 20 can be reduced, and spherical aberration can be corrected at the long focal length extremity in particular.

If $\Delta$IASP exceeds the upper limit of condition (7), the effect of the correcting of spherical aberration by the aspherical surface is diminished, so that the correcting of aberrations cannot be sufficiently achieved.

If $\Delta$IASP exceeds the lower limit of condition (7), the amount of asphericity becomes large, so that manufacture of the lens element with the aspherical surface becomes difficult.

Condition (8) specifies the amount of change of the distortion coefficient due to an aspherical surface in the case where at least one lens element having at least one aspherical surface thereon is provided in the negative third lens group 30. By satisfying this condition, the number of lens elements constituting the thrid lens group 30 can be reduced, and distortion can be corrected at the short focal length extremity in particular.

If $\Delta$VASP exceeds the upper limit of condition (8), the amount of asphericity increases, and manufacture of the lens element with the aspherical surface becomes difficult.

If $\Delta$VASP exceeds the lower limit of condition (8), the effect of the correcting of distortion by the aspherical surface is diminished, so that the correcting of aberrations cannot be sufficiently achieved.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two type of dotted lines respectively indicate magnification with respect to the g and C lines; however, the d line as the base line coincides with the ordinates. S designates the sagittal image, and M designates the meridional image. In the tables, Fno designates the F-number, f designates the focal length of the entire lens system, W designates the half angle-of-view (°), $f_B$ designates the back focal distance, r designates the radius of curvature, d designates the lens-element thickness or distance between lens elements, Nd designates the refractive index at the d-line, and v designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}\ldots$$

wherein:
  x designates a distance from a tangent plane of an aspherical vertex;
  C designates a curvature of the aspherical vertex (1/R);
  h designates a distance from the optical axis;
  K designates the conic coefficient; and
  A4 designates a fourth-order aspherical coefficient;
  A6 designates a sixth-order aspherical coefficient;
  A8 designates a eighth-order aspherical coefficient; and
  A10 designates a tenth-order aspherical coefficient.

Embodiment 1

FIGS. 1 through 4D show the first embodiment of the zoom lens system. According to the lens arrangement of the first embodiment shown in FIG. 1, the first lens group 10 includes a first lens element 10a having a concave surface facing towards the object, and a positive second lens element 10b, in this order from the object. The second lens group 20 includes cemented lens elements having a negative lens element and a positive lens element, cemented lens elements having a positive lens element and a negative lens element, and a positive lens element having an aspherical surface on the image-side surface (a lens element having at least one aspherical surface), in this order from the object. The third lens group 30 includes a positive lens element having an aspherical surface on the object-side surface, and a negative lens element, in this order from the object. By constituting the first lens group 10 with a negative first lens element 10a and a positive second lens element 10b, in this order from the object, the thickness of the first lens group 10 can be reduced, so that the front-to-back length of a camera can be reduced.

Figure 1:
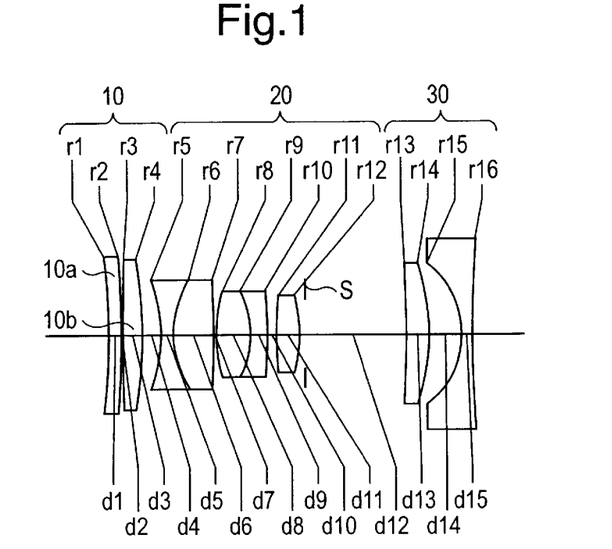
FIG. 1 is a lens arrangement of the zoom lens system according to a first embodiment of the present invention.
Figures 2A, 2B:
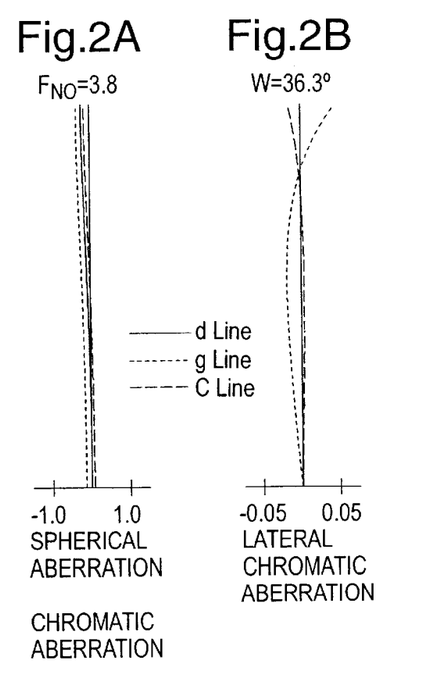
FIGS. 2A, 2B, 2C and 2D show aberrations, at the short focal length extremity, of the lens arrangement shown in FIG. 1.
Figure 2C:
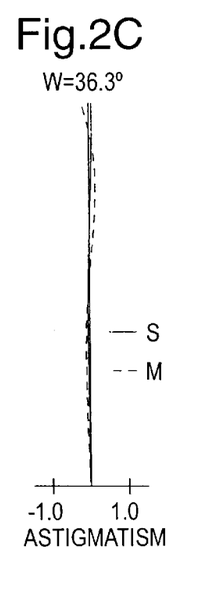
Figure 2D:
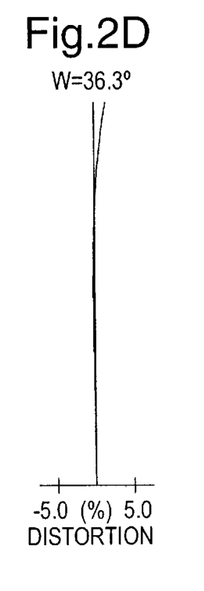
Figures 3A, 3B:
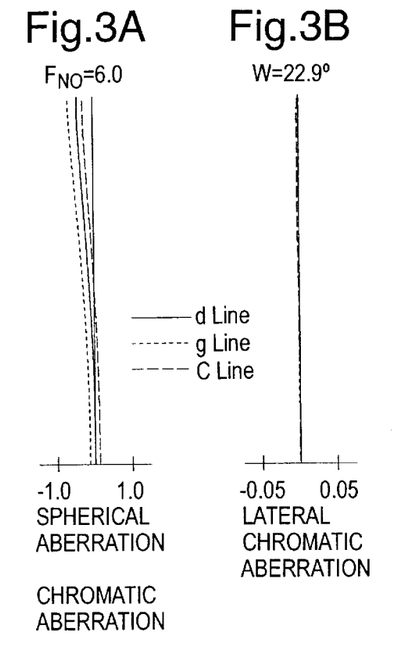
FIGS. 3A, 3B, 3C and 3D show aberrations, at an intermediate focal length, of the lens arrangement shown in FIG. 1.
Figure 3C:
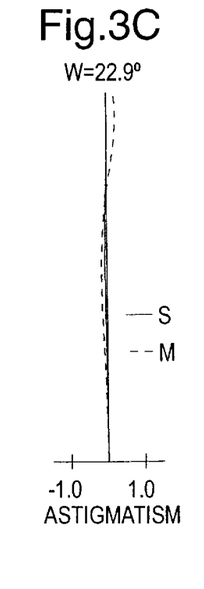
Figure 3D:
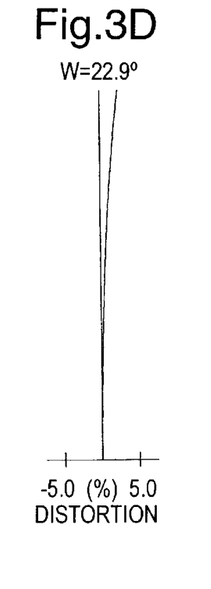
Figures 4A, 4B:
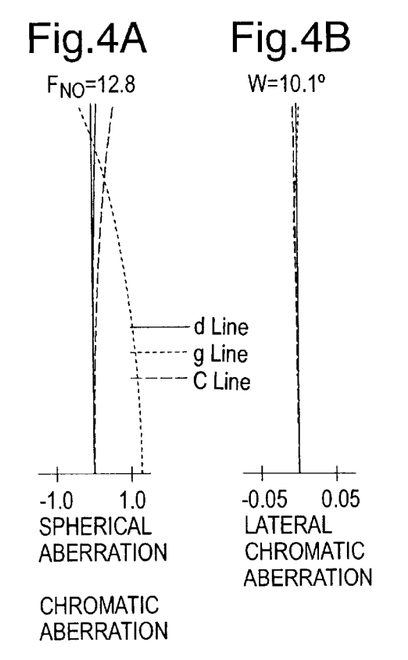
FIGS. 4A, 4B, 4C and 4D show aberrations, at the long focal length extremity, of the lens arrangement shown in FIG. 1.
Figure 4C:
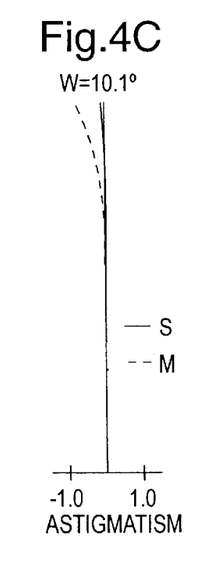
Figure 4D:
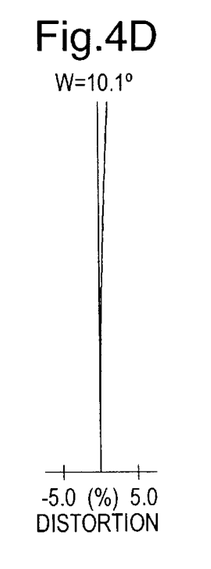

FIGS. 2A,through 2D show aberrations of the zoom lens system at the short focal length extremity; FIGS. 3A through 3D show aberrations of the zoom lens system at an intermediate focal length; and FIGS. 4A through 4D show aberrations of the zoom lens system at the long focal length extremity. The aperture stop S is positioned 0.75 mm toward the image from the surface No. Table 1 shows the numerical data of the first embodiment.

TABLE 1

$F_{NO}$ = 3.8–6.0–12.8
f = 29.00–50.00–120.00 (zoom ratio: 4.14)
W = 36.3–22.9–10.1
$f_B$ = 8.28–26.62–82.42

| Surface No. | r | d | Nd | v |
| --- | --- | --- | --- | --- |
| 1 | −65.396 | 1.50 | 1.84600 | 23.8 |
| 2 | −129.762 | 0.10 | — | — |
| 3 | 209.037 | 2.40 | 1.60000 | 52.8 |
| 4 | −58.221 | 2.29–9.57–22.29 | — | — |
| 5 | −18.907 | 1.51 | 1.83481 | 42.7 |
| 6 | 12.706 | 4.94 | 1.79808 | 25.8 |
| 7 | −99.121 | 0.35 | — | — |
| 8 | 19.932 | 4.13 | 1.48749 | 70.2 |
| 9 | −11.217 | 2.00 | 1.84666 | 23.8 |

TABLE 1-continued $F_{NO} = 3.8$–$6.0$–$12.8$
$f = 29.00$–$50.00$–$120.00$ (zoom ratio: 4.14)
$W = 36.3$–$22.9$–$10.1$
$f_B = 8.28$–$26.62$–$82.42$

| Surface No. | r | d | Nd | ν |
|---|---|---|---|---|
| 10 | −59.077 | 1.19 | — | — |
| 11 | 51.750 | 2.83 | 1.73077 | 40.5 |
| 12* | −16.950 | 13.01–7.10–1.91 | — | — |
| 13* | −68.356 | 2.85 | 1.58547 | 29.9 |
| 14 | −24.870 | 3.98 | — | — |
| 15 | −10.899 | 1.40 | 1.69000 | 56.3 |
| 16 | 185.621 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 12 | 0.00 | $0.5762 \times 10^{-4}$ | $-0.7034 \times 10^{-7}$ | $0.1383 \times 10^{-8}$ |
| 13 | 0.00 | $0.5776 \times 10^{-4}$ | $-0.5696 \times 10^{-7}$ | $0.3428 \times 10^{-8}$ |

Embodiment 2

Figure 5:
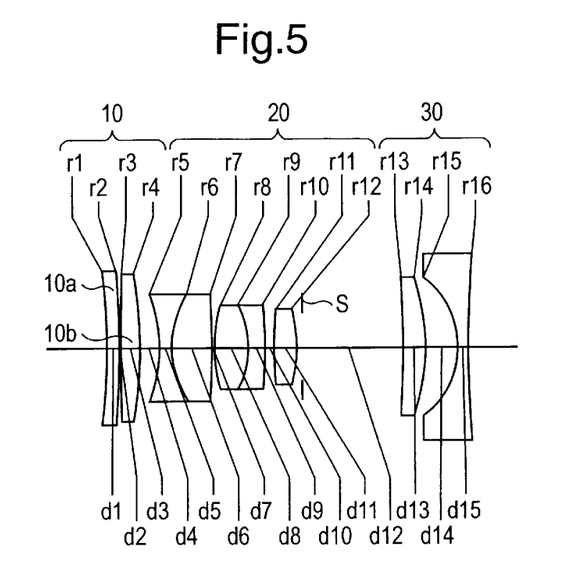
FIG. 5 is a lens arrangement of the zoom lens system according to a second embodiment of the present invention.
Figures 6A, 6B:
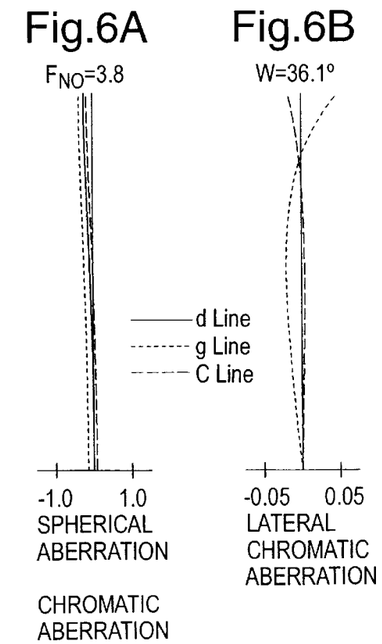
FIGS. 6A, 6B, 6C and 6D show aberrations, at the short focal length extremity, of the lens construction shown in FIG. 5.
Figure 6C:
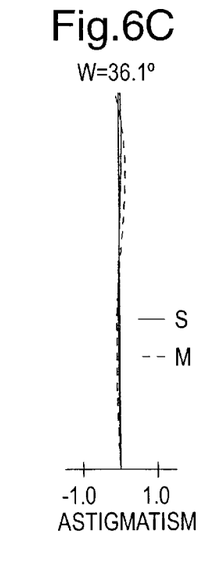
Figure 6D:
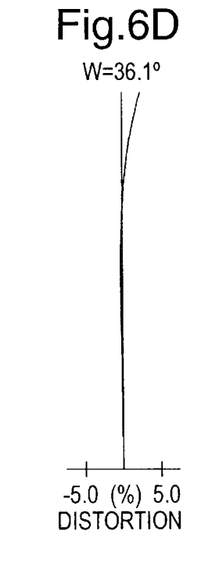
Figures 7A, 7B:
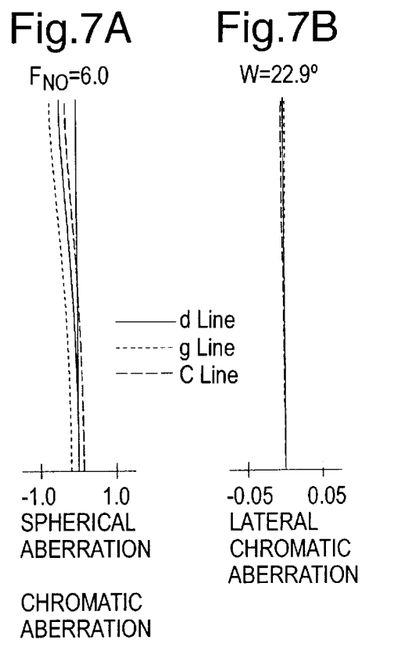
FIGS. 7A, 7B, 7C and 7D show aberrations, at an intermediate focal length, of the lens arrangement shown in FIG. 5.
Figure 7C:
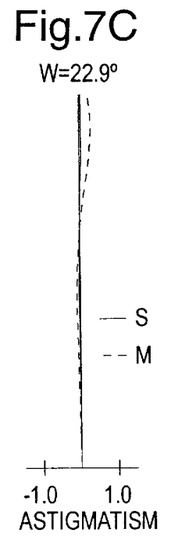
Figure 7D:
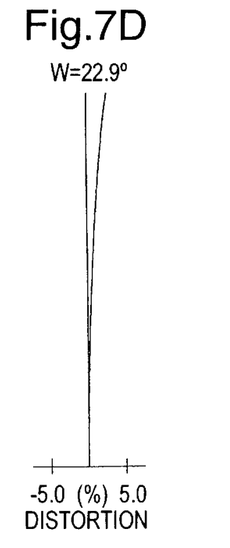
Figures 8A, 8B:
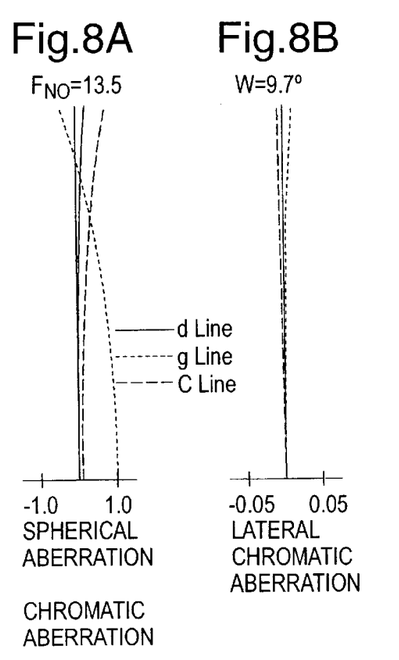
FIGS. 8A, 8B, 8C and 8D show aberrations, at the long focal length extremity, of the lens arrangement shown in FIG. 5.
Figure 8C:
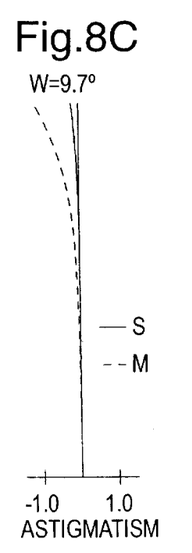
Figure 8D:
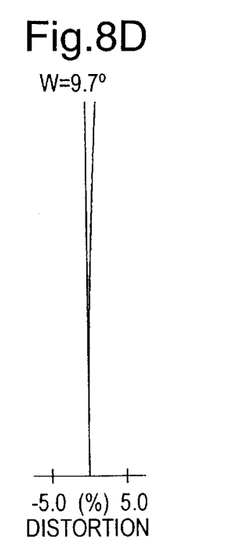

FIGS. 5 through 8D show the second embodiment of the zoom lens system. FIG. 5 shows the lens arrangement of the second embodiment. FIGS. 6A, through 6D show aberrations of the zoom lens system at the short focal length extremity; FIGS. 7A through 7D show aberrations of the zoom lens system at an intermediate focal length; and FIGS. 8A through 8D show aberrations of the zoom lens system at the long focal length extremity. The aperture stop S is positioned 0.75 mm toward the image from the surface No. 12. Table 2 shows the numerical data of the second embodiment. The basic lens arrangement of the second embodiment is the same as the first embodiment.

TABLE 2

$F_{NO} = 3.8$–$6.0$–$13.5$
$f = 29.00$–$50.00$–$125.00$ (zoom ratio: 4.31)
$W = 36.1$–$22.9$–$9.7$
$f_B = 8.28$–$26.78$–$86.97$

| Surface No. | r | d | Nd | ν |
|---|---|---|---|---|
| 1 | −65.762 | 1.50 | 1.84600 | 23.8 |
| 2 | −146.939 | 1.10 | — | — |
| 3 | 224.927 | 2.44 | 1.60043 | 46.4 |
| 4 | −54.517 | 2.29–9.67–23.15 | — | — |
| 5 | −18.589 | 1.72 | 1.83481 | 42.7 |
| 6 | 13.719 | 4.69 | 1.80704 | 25.4 |
| 7 | −98.032 | 0.35 | — | — |
| 8 | 20.155 | 4.22 | 1.48749 | 70.2 |
| 9 | −11.215 | 2.00 | 1.84666 | 23.8 |
| 10 | −59.552 | 1.19 | — | — |
| 11 | 51.750 | 2.83 | 1.73077 | 40.5 |
| 12* | −16.950 | 13.31–7.32–1.89 | — | — |
| 13* | −68.020 | 2.89 | 1.58547 | 29.9 |
| 14 | −24.034 | 3.79 | — | — |
| 15 | −11.133 | 1.40 | 1.69000 | 56.3 |
| 16 | 131.238 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 12 | 0.00 | $0.5762 \times 10^{-4}$ | $-0.7034 \times 10^{-7}$ | $0.1383 \times 10^{-8}$ |
| 13 | 0.00 | $0.5441 \times 10^{-4}$ | $-0.4473 \times 10^{-7}$ | $0.2819 \times 10^{-8}$ |

Embodiment 3

Figure 9:
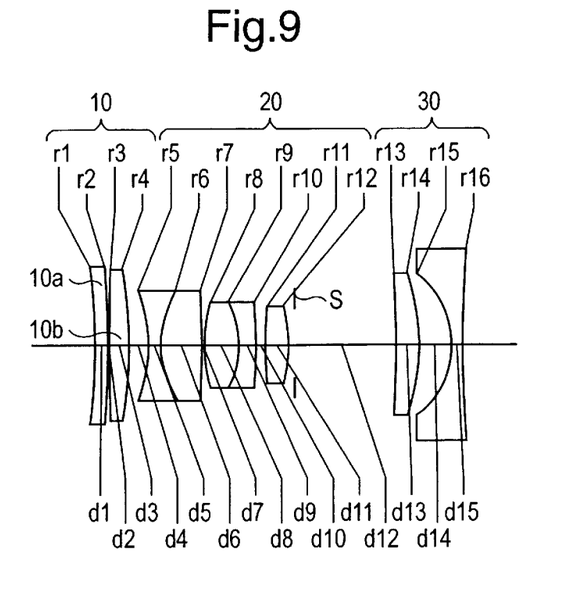
FIG. 9 is a lens arrangement the zoom lens system according to a third embodiment the present invention.
Figures 10A, 10B:
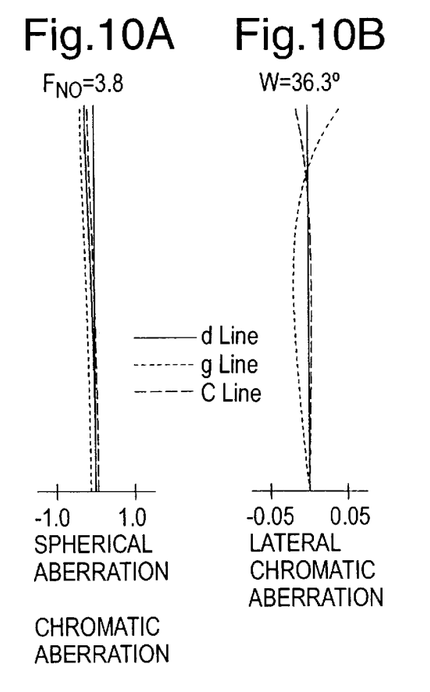
FIGS. 10A, 10B, 10C and 10D show aberrations, at the short focal length extremity, of the lens arrangement shown in FIG. 9.
Figure 10C:
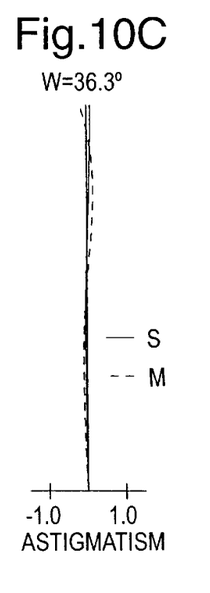
Figure 10D:
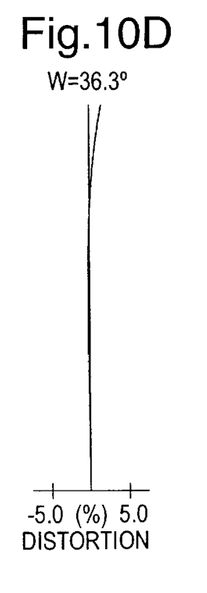
Figures 11A, 11B:
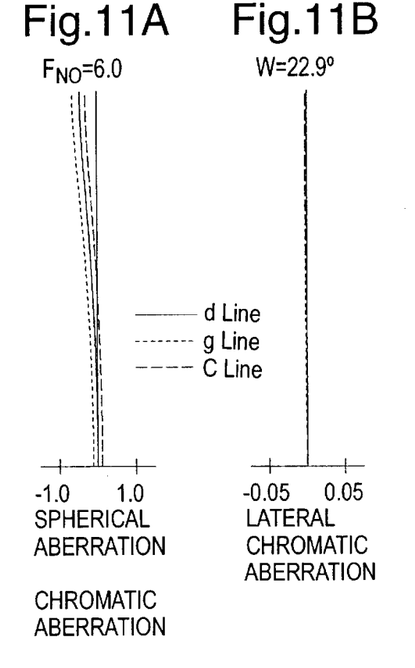
FIGS. 11A, 11B, 11C and 11D show aberrations, at an intermediate focal length, of the lens arrangement shown in FIG. 9.
Figure 11C:
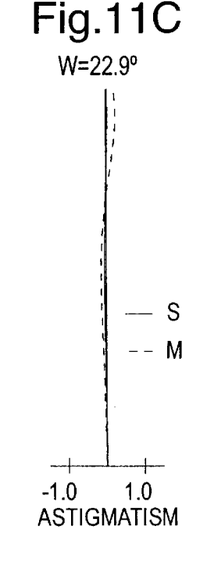
Figure 11D:
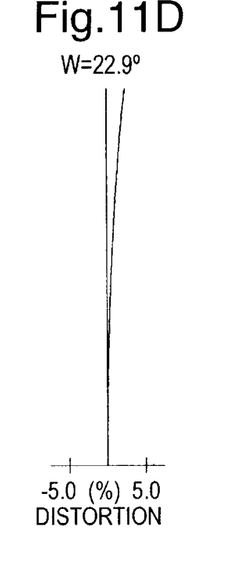
Figures 12A, 12B:
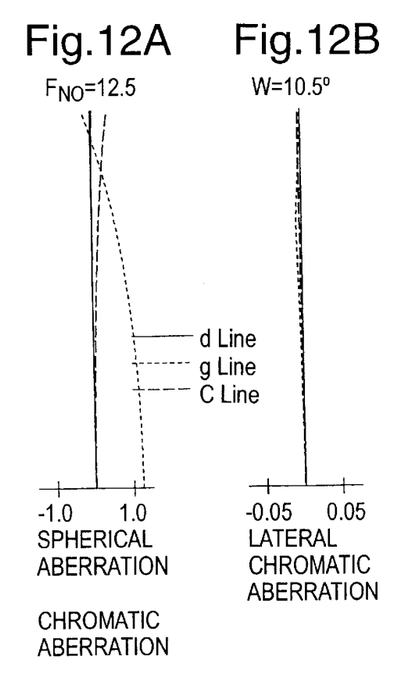
FIGS. 12A, 12B, 12C and 12D show aberrations, at the long focal length extremity, of the lens arrangement shown in FIG. 9.
Figure 12C:
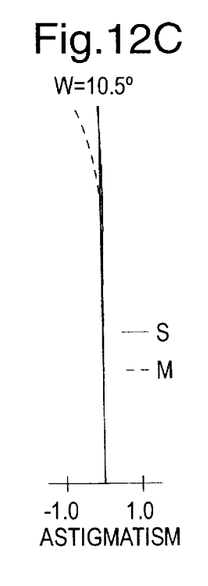
Figure 12D:
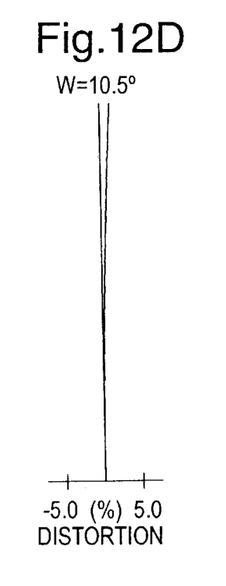

FIGS. 9 through 12D show the third embodiment of the zoom lens system. FIG. 9 shows the lens arrangement of the third embodiment. FIGS. 10A, through 10D show aberrations of the zoom lens system at the short focal length extremity; FIGS. 11A through 11D show aberrations of the zoom lens system at an intermediate focal length; and FIGS. 12A through 12D show aberrations of the zoom lens system at the long focal length extremity. The aperture stop S is positioned 0.75 mm toward the image from the surface No. 12. Table 3 shows the numerical data of the third embodiment. The basic lens arrangement of the second embodiment is the same as the first embodiment.

TABLE 3

$F_{NO} = 3.8$–$6.0$–$12.5$
$f = 29.00$–$50.00$–$115.00$ (zoom ratio: 3.97)
$W = 36.3$–$22.9$–$10.5$
$f_B = 8.27$–$26.63$–$78.74$

| Surface No. | r | d | Nd | ν |
|---|---|---|---|---|
| 1 | −65.341 | 1.50 | 1.84600 | 23.8 |
| 2 | −131.137 | 0.10 | — | — |
| 3 | 216.503 | 2.40 | 1.60000 | 53.2 |
| 4 | −57.771 | 2.29–9.57–21.65 | — | — |
| 5 | −18.868 | 1.60 | 1.83481 | 42.7 |
| 6 | 13.015 | 4.88 | 1.80168 | 25.6 |
| 7 | −99.320 | 0.35 | — | — |
| 8 | 19.929 | 4.13 | 1.48749 | 70.2 |
| 9 | −11.188 | 2.00 | 1.84666 | 23.8 |
| 10 | −59.256 | 1.18 | — | — |
| 11 | 51.750 | 2.83 | 1.73077 | 40.5 |
| 12* | −16.950 | 12.99–7.09–2.09 | — | — |
| 13* | −69.112 | 2.83 | 1.58547 | 29.9 |
| 14 | −25.019 | 3.99 | — | — |
| 15 | −10.896 | 1.40 | 1.69000 | 56.3 |
| 16 | 185.421 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 12 | 0.00 | $0.5762 \times 10^{-4}$ | $-0.7034 \times 10^{-7}$ | $0.1383 \times 10^{-8}$ |
| 13 | 0.00 | $0.5740 \times 10^{-4}$ | $-0.4367 \times 10^{-7}$ | $0.3292 \times 10^{-8}$ |

The numerical values of each condition of each embodiment are shown in Table 4.

TABLE 4

| | Embod. 1 | Embod. 2 | Embod. 3 |
|---|---|---|---|
| Cond. (1) | 0.69 | 0.72 | 0.67 |
| Cond. (2) | 5.01 | 5.18 | 4.84 |
| Cond. (3) | 5.85 | 6.03 | 5.61 |
| Cond. (4) | 0.77 | 0.80 | 0.75 |
| Cond. (5) | −2.26 | −2.27 | −2.25 |

TABLE 4-continued

|  | Embod. 1 | Embod. 2 | Embod. 3 |
|---|---|---|---|
| Cond. (6) | −5.43 | −4.89 | −5.36 |
| Cond. (7) | −719.48 | −812.59 | −652.83 |
| Cond. (8) | 0.18 | 0.17 | 0.17 |

As can be understood from Table 4, each embodiment satisfied each condition. Furthermore, as can be understood from the aberration diagrams, the aberrations of each embodiment are adequately corrected.

According to the above description, a small three-lens-group zoom lens system of telephoto type which has a zoom ratio of about 4.0, and has the half angle of view at the short focal length extremity is more than 35° can be achieved.

What is claimed is:

1. A zoom lens system comprising a positive first lens group, a positive second lens group, and a negative third lens group, in this order from an object, wherein zooming is performed by moving said first through said third lens groups in the optical axis direction, and wherein said zoomlens system satisfies the following conditions:

$$0.62 < (d_{T12} - d_{W12})/f_W < 1.0$$

$$4 < f_T/f_{12T} < 6$$

$$5 < f_T/|f_{3G}| < 8$$

wherein $d_{T12}$ designates the distance between said first lens group and said second lens group at the long focal length extremity;

$d_{W12}$ designates the distance between said first lens group and said second lens group at the short focal length extremity;

$f_W$ designates the focal length of the entire zoom lens system at the short focal length extremity;

$f_T$ designates the focal length of the entire zoom lens system at the long focal length extremity;

$f_{12T}$ designates the combined focal length of said first lens group and said second lens group at the long focal length extremity; and $f_{3G}$ designates the focal length of said negative third lens group.

2. The zoom lens system according to claim 1, satisfying the following condition:

$$0.7 < d_{T12}/f_W < 1.0$$

3. The zoom lens system according to claim 1, wherein the most-object side surface of said positive first lens group is a concave surface, and said concave surface satisfies the following condition:

$$-5 < r1/f_W < -1$$

wherein r1 designates the radius of curvature of the most-object side concave surface of said first lens group.

4. The zoom lens system according to claim 1, wherein the most-object side lens element of said positive first lens group is a negative lens element, and said negative lens element satisfies the following condition:

$$-0.7 < f_{1P}/f_W < -0.1$$

wherein $f_{1P}$ designates the focal length of the most-object side negative lens element of said first lens group.

5. The zoom lens system according to claim 1, wherein said positive first lens group comprises a negative first single lens element, and a positive single lens element, in this order from said object.

6. The zoom lens system according to claim 1, wherein said positive second lens group comprises a lens element having at least one aspherical surface, and said aspherical surface satisfies the following condition:

$$-1000 < \Delta IASP < -500$$

wherein $\Delta IASP$ designates the amount of change of the spherical aberration coefficient due to the aspherical surface under the condition that the focal length of the entire zoom lens system at the long focal length extremity is converted to 1.0.

7. The zoom lens system according to claim 1, wherein said negative third lens group comprises a lens element having at least one aspherical surface, and said aspherical surface satisfies the following condition:

$$0 < \Delta VASP < 0.2$$

wherein $\Delta VASP$ designates the amount of change of the distortion coefficient due to the aspherical surface under the condition that the focal length of the entire zoom lens system at the short focal length extremity is converted to 1.0.

* * * * *